(12) United States Patent
Bodum et al.

(10) Patent No.: US 8,196,905 B2
(45) Date of Patent: Jun. 12, 2012

(54) ELECTRIC MILK FROTHER

(75) Inventors: Jorgen Bodum, Meggen (CH); Thomas Studer, Lucerne (CH)

(73) Assignee: PI-Design AG, Triengen (CH)

( * ) Notice: Subject to any disclaimer, the term of this patent is extended or adjusted under 35 U.S.C. 154(b) by 513 days.

(21) Appl. No.: 12/445,796

(22) PCT Filed: Oct. 3, 2007

(86) PCT No.: PCT/CH2007/000489
§ 371 (c)(1),
(2), (4) Date: Apr. 16, 2009

(87) PCT Pub. No.: WO2008/049246
PCT Pub. Date: May 2, 2008

(65) Prior Publication Data
US 2010/0295194 A1 Nov. 25, 2010

(30) Foreign Application Priority Data

Oct. 25, 2006 (CH) ........................................ 1706/06

(51) Int. Cl.
*B01F 3/04* (2006.01)

(52) U.S. Cl. ........................ 261/91; 261/DIG. 26; 99/460

(58) Field of Classification Search .................... 261/83, 261/91, DIG. 26; 99/460; 426/474
See application file for complete search history.

(56) References Cited

U.S. PATENT DOCUMENTS

| 2,240,237 | A |   | 4/1941  | Anderson              |
|-----------|---|---|---------|-----------------------|
| 2,584,202 | A | * | 2/1952  | Harp, Sr. ...... 261/75 |
| 3,185,451 | A |   | 5/1965  | Snyder                |
| 3,295,997 | A | * | 1/1967  | Tomlinson et al. ...... 241/34 |
| 3,920,223 | A | * | 11/1975 | Krueger ...... 366/156.2 |
| 5,939,122 | A | * | 8/1999  | Brady ...... 426/474   |
| 6,095,676 | A | * | 8/2000  | Kuan ...... 366/256    |
| 6,558,035 | B2|   | 5/2003  | Lane                  |
| D476,523  | S |   | 7/2003  | Bodum                 |
| 6,764,704 | B2| * | 7/2004  | Schub ...... 426/474   |
| 7,264,232 | B2| * | 9/2007  | Rohde ...... 261/91    |
| 7,441,941 | B2| * | 10/2008 | Vernon ...... 366/130  |
| 2003/0177914 | A1 | | 9/2003 | Schub                 |
| 2005/0029685 | A1 | * | 2/2005 | Zhao ...... 261/87    |

FOREIGN PATENT DOCUMENTS

| DE | 28 43 369   A1 | 4/1980  |
| GB | 11362       A  | 0/1909  |
| WO | 93/25135    A1 | 12/1993 |

OTHER PUBLICATIONS

International Preliminary Report and Written Opinion for International Appn. No. PCT/CH2007/000489 dated May 14, 2009.

* cited by examiner

*Primary Examiner* — Charles Bushey
(74) *Attorney, Agent, or Firm* — Sughrue Mion, PLLC

(57) ABSTRACT

A milk frothing apparatus comprising a drive unit which drives a shaft. An elongate, flexible, bent frothing element that has an adjustable shape which preferably adjusts to the surface of the liquid to be frothed during operation is connected to the shaft. In a particular embodiment, the frothing element is designed as a flexible helical coil. In addition, another frothing element can be provided at the lower end of the shaft.

28 Claims, 2 Drawing Sheets

ELECTRIC MILK FROTHER

This disclosure was previously filed as PCT International Application No. PCT/CH2007/000489 on Oct. 3, 2007 and claims priority to prior Switzerland Patent Application No. 01706/06 filed Oct. 25, 2006.

TECHNICAL FIELD

The present invention relates to an apparatus for frothing a liquid foodstuff, in particular milk. In the following, an apparatus of this type is called a milk frothing apparatus for short.

PRIOR ART

The prior art discloses compact, battery-operated milk frothing apparatuses which comprise a drive part with an electric motor and a battery compartment, a shaft which extends downward from the drive part and is connected to the electric motor, and a frothing element which is mounted on the lower end of the shaft. The frothing element may, in particular, be in the form of a toroidal coil which extends perpendicular to the shaft around the longitudinal direction defined by the shaft and is guided on an annular wire holder. Milk frothing apparatuses of this type are disclosed, for example, in US-A-2003/0177914 or U.S. Pat. No. 6,558,035. Types of frothing elements other than a toroidal coil are also known. For example, U.S. Design Pat. No. 476,523 discloses a milk frothing apparatus with a frothing element which has a conical shape which widens to a great extent at the bottom, wherein wave-like structures are formed in the surface of the frothing element at the base of the cone.

Milk frothing apparatuses of this type produce froth by introducing air into the milk and finely dividing the air bubbles produced as a result. This creates a mixture of milk and small finely distributed air bubbles which is stabilized by the properties of the milk to form a froth. It is important here for the milk frothing apparatus to actually be able to introduce air into the milk. In the case of known milk frothing apparatuses, the user has to periodically move the frothing element to and fro between the base of the vessel and the surface of the milk in the vessel for this purpose, in order to ensure firstly that the frothing element actually introduces air at the surface of the milk, and secondly that the air bubbles are sufficiently broken up throughout the vessel. If, in contrast, the user were to hold the frothing element only in the region of the base of the vessel, the milk would be stirred but no froth would be produced.

This is disadvantageous particularly when the milk frothing apparatus is not designed to be handheld but is intended to be placed on a vessel. In this case, it is not readily possible for the frothing element to move to and fro between the base of the vessel and the surface of the milk during operation. However, it is desirable to improve the frothing effect in the case of handheld milk frothing apparatuses too.

SUMMARY OF THE INVENTION

One object of the present invention is therefore to provide an apparatus for frothing liquid foodstuffs, in particular milk, in which apparatus the frothing effect is improved compared to the apparatuses known from the prior art. The apparatus should also be easy to handle and simple and cost-effective to produce and be suitable for frothing different quantities of the liquid.

This and other objects are achieved by an apparatus for frothing liquid foodstuffs, comprising:
- a drive for generating a rotary movement;
- a shaft which is connected to the drive, the shaft having a first end close to the drive and a second end remote from the drive; and
- an elongate, flexible frothing element which is connected to the shaft at at least a first fixing point and a second fixing point that is axially different from said first fixing point, the frothing element having a length between the first and the second fixing points, at least during operation of the apparatus, that is greater than the distance between the first and second fixing points, so that the frothing element assumes a bent shape, the frothing element being sufficiently flexible for its shape to be changeable during operation of the apparatus due to centrifugal forces in the event of rotary movement of the shaft.

The apparatus according to the invention comprises a drive which is suitable for generating a rotary movement, for example an electric motor. The drive will normally generate uniform rotation in a predetermined direction, but rotary oscillation, that is to say periodic rotation back and forth, may also be generated. A shaft is connected to the drive and is made to rotate by this drive. The invention provides at least one elongate, flexible frothing element which is connected to the shaft at two axially different fixing points. The length of the frothing element between the fixing points at least during operation of the apparatus is greater than the distance between the fixing points, so that the frothing element assumes a bent shape, preferably with multiple bends.

During operation of the apparatus, the frothing element extends through the surface of the liquid to be frothed and, when the shaft is rotated, introduces air bubbles into the liquid, these air bubbles then being broken up further by the frothing element. This creates a frothing effect irrespective of the extent to which the milk frothing apparatus is immersed in the liquid. In particular, a frothing effect is achieved irrespective of the liquid level in the vessel in which the liquid is contained.

The frothing element is preferably flexible enough for its shape to be changed by centrifugal forces which act on the frothing element during operation of the apparatus. The change in shape may be of an elastic or plastic nature. The frothing element may optionally be designed to be longitudinally elastic too, so that its length may increase due to the centrifugal forces. In a feasible embodiment, the frothing element has a greater length than that given by the distance between the fixing points only during operation on account of such forces, and thus assumes a bent shape only through these.

In addition, during frothing of a liquid, forces also act on the frothing element on account of the flow resistance and can likewise lead to a change in shape and possibly a change in length. In a preferred embodiment, the frothing element assumes a shape which substantially follows the surface of the liquid to be frothed in a subregion of the frothing element on account of the combined centrifugal and flow forces and due to the flexibility and possible longitudinal elasticity of said frothing element. As a result, air is mixed into the liquid very efficiently over a relatively large area, and the result is a very high-quality frothing effect.

However, the frothing element may also be bent in a generally meandering manner, without considerably changing shape during operation. In the present context, a meandering element is first understood very generally to mean an element with an elongate basic shape whose longitudinal direction is multiply or continually changed. In this way, a meandering element has a greater length than that given by the direct distance between the two ends of the element. In particular, the frothing element may be bent in a spiral or helical manner. A spiral element is understood to mean an element with an elongate basic shape, of which the longitudinal direction is continually wound around a spiral axis. In the sense of the definitions of terms used here, the term "meandering" therefore represents a generic term for the term "spiral". If the distance between the longitudinal axis of the body and the spiral axis is constant, a spiral element may also be designated helical.

In a preferred refinement, the frothing element extends substantially continuously along the entire length of the shaft between an end of the shaft which is close to the housing and an end of the shaft which is remote from the housing. In this way, a frothing effect is achieved at any desired liquid level. The maximum radial distance between the frothing element and the shaft is preferably smaller than the axial distance between the first and second fixing points on the shaft, more preferably smaller than half the axial distance. In other words, the frothing element preferably does not extend too far away from the shaft, in order to avoid an excessively large unbalance on the drive and splashing of the liquid to be frothed.

To this end, the frothing element can additionally be fixed to the shaft at least a third fixing point, which is situated between the first and the second fixing points, at least in the radial direction. The third fixing point is preferably of axially displaceable design. In this way, the shape assumed by the frothing element during operation can be varied and matched to different operating situations, in particular different quantities of liquid to be frothed.

The frothing element is preferably in the form of a flexible helical coil, in particular a wire coil. Provided that the wire is not too thick and rigid, a coil of this type has a coil axis which is flexible even under a relatively low level of force. The shaft can pass through selected turns of the helical coil at the fixing points. However, it is also feasible to fix the helical coil in such a way that the shaft does not pass through any of the turns, by said coil being fixed to the shaft by means of clips or loops for example. The coil may optionally be guided on a support element, for example in the form of a flexible filament or wire. However, an unsupported coil is preferred for the purpose of simplified cleaning.

The invention also relates very generally to an apparatus for frothing liquid foodstuffs, which apparatus has a drive, a shaft which can be driven by the drive, and a frothing element which is connected to the shaft, wherein the frothing element comprises a helical coil which is connected to the shaft at two axially different fixing points, that is to say extends at least along a section of the shaft, preferably substantially over the entire length of the shaft. According to this aspect of the invention, the coil therefore does not necessarily need to be flexible. In this case, the coil is also preferably bent in a meandering manner, in particular in a spiral manner. In addition, at least one further fixing point is preferably provided on the shaft in this case too.

In addition to the frothing element described above, the apparatus according to the invention may also comprise a further frothing element which is mounted at that end of the shaft which is remote from the housing. The first frothing element may be of conventional design, that is to say may be designed in any desired known manner, in particular may comprise a toroidal coil which is arranged substantially perpendicular to the shaft. A toroidal coil is understood to mean an elongate, helical coil, of which the helix axis is bent to form a ring or partial ring. The ring is preferably a circular ring, but other basic shapes for the ring are also feasible, for example the oval and heart-shaped, substantially annularly closed shapes known from U.S. Design Pat. Nos. 489,583 and 490,667. In this case, the ring defines a ring plane which preferably extends substantially perpendicular to the longitudinal direction defined by the shaft. The coil is guided on a support element, preferably in the form of an open or closed ring, which extends through the turns of the coil. This annular support element is preferably integrally formed with the shaft from a wire ring which is formed from a sufficiently rigid wire.

The proposed shape has generally proven highly advantageous for producing froth.

The drive preferably comprises an electric motor, in particular a battery-operated electric motor. The electric motor and the batteries which may be present are preferably accommodated in a common housing. The housing may be formed such that it is held in the hand of a user, or it may be designed to be placed on a vessel. In principle however, a drive of different configuration, for example a manual drive, for example a crank drive or an electric motor which is supplied with power by a solar cell, could also be provided.

Since the apparatus according to the invention no longer has to be moved up and down by hand in order to introduce enough air into the liquid, the apparatus may be designed to be held on a vessel. To this end, means for holding the housing in the vessel, for example stop elements in the form of rings, projections or arms, with which the housing can be placed on the upper edge of the vessel, are preferably formed on a housing, which accommodates the drive. An annular bearing surface with which the housing can be placed on the upper edge of the vessel is particularly advantageously formed on the housing. This ensures that the liquid to be frothed cannot splash out of the vessel.

However, the invention also encompasses apparatuses in which the drive unit is held and guided by hand. The presence of a second frothing element which extends in a meandering manner along the shaft provides advantages when frothing the liquid in this case too.

Although the apparatus according to the invention is preferably used as a milk frothing apparatus, it goes without saying that it can also be used to froth other liquids, including liquids with two or more phases, for example for producing salad dressings from vinegar, oil and possibly other ingredients, for beating egg whites or for stirring cocoa powder or pudding mix into milk, and for other applications.

BRIEF DESCRIPTION OF THE DRAWINGS

Preferred embodiments of the invention are described in the following with reference to the drawings, in which.

DETAILED DESCRIPTION OF PREFERRED EMBODIMENTS

Figure 1:
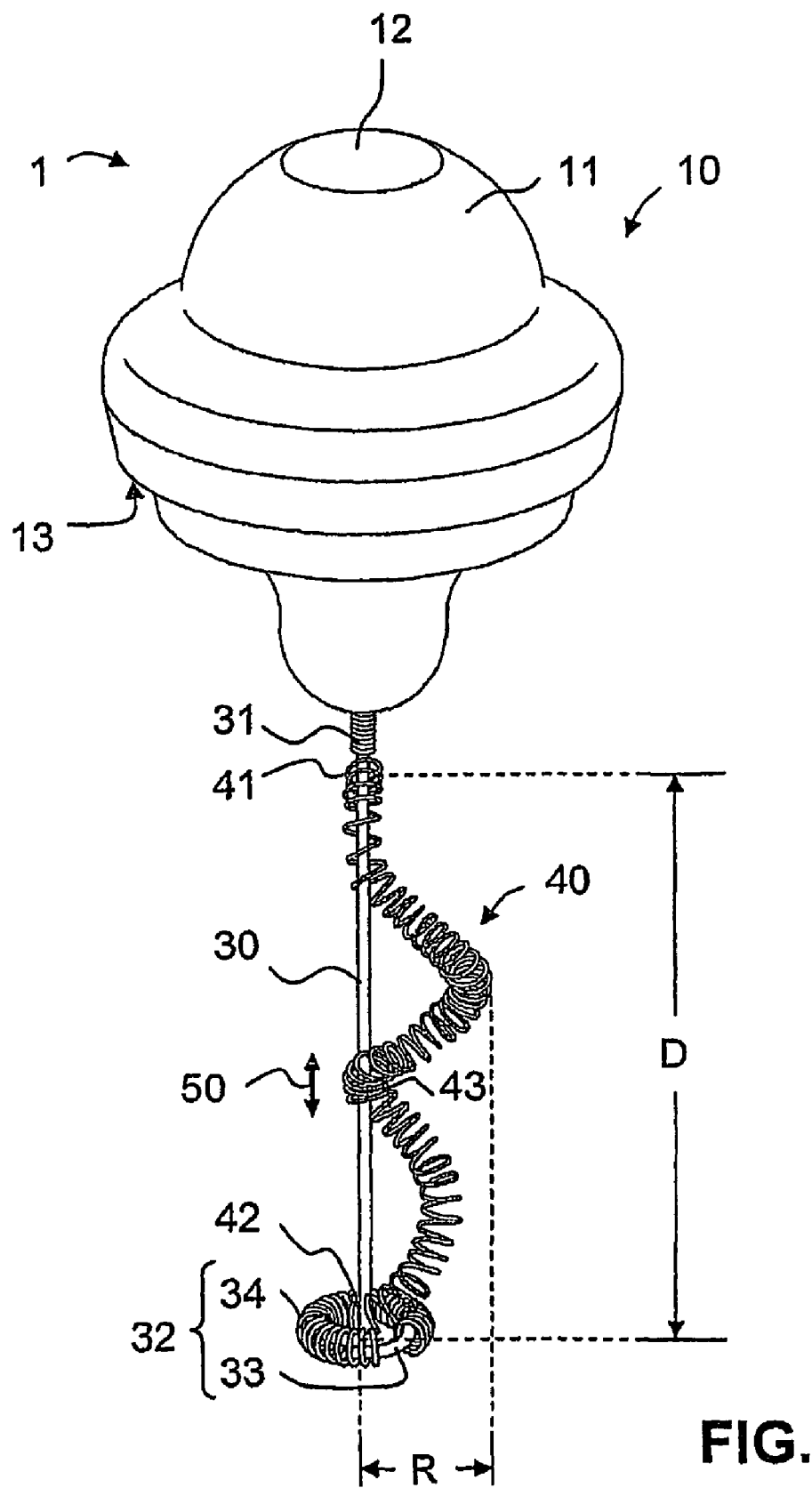
FIG. 1 shows a perspective view of a first embodiment of a milk frothing apparatus according to the invention.

FIG. 1 shows a perspective view of a first embodiment of a milk frothing apparatus according to the invention. The milk frothing apparatus has a drive part 10 with a housing 11 in which an electric motor and batteries for driving the electric motor are accommodated. The electric motor can be switched on and switched off by means of a switch 12 which is mounted centrally in this case but can also assume another, for example lateral, position. A shaft 30 which is protected against bending in the region of the passage through the housing by way of an optional helical reinforcement element 31 projects out of the lower end of the housing 11. A conventional lower frothing element 32 which comprises an annular support element 33 and a toroidal coil 34 is formed at the lower end of the shaft 30. The support element 33 forms a continuation of the shaft by the lower end of the shaft, which is produced from rigid wire, having been bent to form a ring. In addition, an upper frothing element 40, which is described in greater detail further below, is arranged on the shaft.

The milk frothing apparatus 1 is designed to lie, by way of the housing 11, on the upper edge of a cup (not illustrated in the drawings). An annular bearing surface 13 is formed on the housing 11 for this purpose. The diameters of the housing 11 and of the cup are matched to one another in such a way that the milk frothing apparatus can be placed on the cup in a sealing manner. This prevents liquid from splashing out when the milk is frothed.

The upper frothing element 40 comprises a long coil, that is to say a coil of which the length is considerably greater than its diameter and which has a large number of turns. The coil is produced from a suitable material in such a way that it is flexible even against low levels of force and is longitudinally elastic to a certain extent. Each one end of the coil is fixedly connected to the shaft 30, one end close to the end of the shaft which is close to the housing and one end close to the end of the shaft which is remote from the housing, at a fixing point 41 and, respectively, 42, for example by soldering, adhesive-bonding or spot-welding. It is also feasible to pass the relatively fine wire of the coil, of which the diameter is considerably smaller than that of the shaft, through radial holes in the shaft at the fixing points and in this way to fix said wire in the shaft. In addition, the shaft 30 is passed through the seven topmost turns of the coil in the present example. The coil therefore extends along the entire length of the shaft from the reinforcement element 31 in the housing 11 to the lower frothing element 32 overall. Since the length of the coil is greater than the distance between the fixing points 41, 42, the coil is inherently bent and has regions which are at a certain radial distance from the shaft.

In the present example, the coil is additionally connected to the shaft at a third fixing point 43 by the shaft being guided through some turns in a central region of the coil. This type of connection permits the position of this third fixing point to be varied along the axial direction 50 by the turns through which the shaft is passed being axially displaced in a simple manner along the shaft 30. It goes without saying that another way of displaceably fixing the coil to the shaft is also possible.

The shaft 30 is made to rotate by the drive unit 10 during operation. As a result, the lower frothing element 32 and the upper frothing element 40 also rotate about the longitudinal direction of the shaft 30. The lower frothing element 32 is located beneath the surface of the liquid, for example the milk, to be frothed and, in this position alone, would stir the milk but not produce any froth or produce only a little froth since no air would enter the milk. Instead, the upper frothing element 40 takes over this function. Due to the centrifugal forces which are produced when the shaft rotates, firstly the flexible regions of the upper frothing element, which regions lie between the fixing points, are drawn radially outward, and the upper frothing element lengthens to a certain extent on account of its longitudinal elasticity. Secondly, the milk provides a certain flow resistance to the frothing element. This leads to the formation of a vortex in the milk, as a result of which the surface of the milk assumes a concave shape. In order to minimize the flow resistance, the upper frothing element, in interaction with the centrifugal force and flow resistance, attempts to reach the surface of the milk, and in the process approximates, at least in a subregion, the surface shape of the milk rotating in the vessel. If applicable, the third, movable fixing point 43 is also axially displaced in such a way that the flow losses are minimized. Since the rotation speed of the regions of the milk which are close to the surface will never fully correspond to that of the upper frothing element 40, the upper frothing element can in this way generate air bubbles in the milk in a large region of the surface of the milk in a highly efficient manner. These air bubbles are then broken down further by the upper and lower frothing elements together, so that a fine, stable froth is ultimately formed.

In order to avoid excessively high centrifugal forces, excessively high flow forces and an excessively high unbalance due to the load distribution not being axially symmetrical, the coil 40 is designed and fixed such that it cannot assume an excessively large distance from the shaft 30. The maximum distance R is, in particular, considerably smaller than the distance D of the outermost fixing points or the length of the shaft, in the present example smaller than half this distance.

In initial practical experiments, it was possible to achieve a predefined quantity of milk froth with the milk frothing apparatus according to the invention in a considerably shorter time and with a better quality than with a conventional milk frothing apparatus which had only the lower frothing element 32.

The shaft 30, the toroidal coil 34 and the upper frothing element 40 are preferably produced from stainless steel, but can also be produced from another material which is compatible with foodstuffs, in particular at least partially from plastic too.

Figure 2:
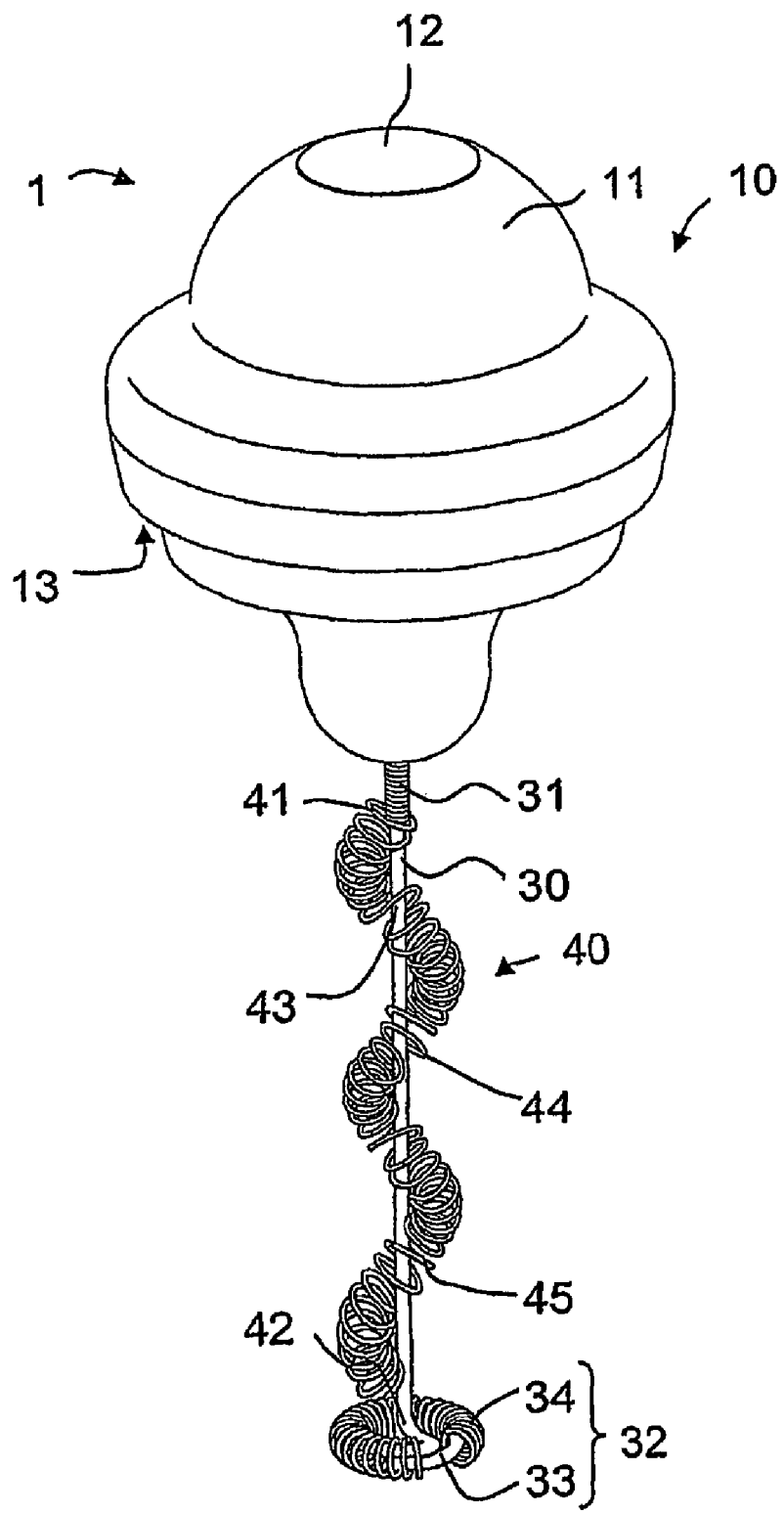
FIG. 2 shows a perspective view of a second embodiment of a milk frothing apparatus according to the invention.

A second exemplary embodiment is illustrated in FIG. 2. The basic structure resembles that of the first exemplary embodiment. Identical elements or elements which act in an identical manner are denoted with the same reference symbols as in the first exemplary embodiment and will not be described again here. The upper frothing element 40 is again in the form of a coil, but the shaft 30 also passes through the ends of said upper frothing element at three further points 43, 44 and 45, causing said upper frothing element to be fixed in the radial direction and to be guided in an essentially meandering or spiral manner along the shaft. The radial area of movement of the frothing element 40 is greatly reduced compared to the first example. Whereas the frothing effect in this exemplary embodiment is somewhat lower than in the first embodiment, the unbalance is better compensated and the tendency to splash is reduced here. Whereas the use of a very flexible coil also leads to an improved frothing effect here, a relatively rigid coil which does not deform significantly during operation can be used in the apparatus of the second exemplary embodiment for the second frothing element.

The invention has been described above with reference to exemplary embodiments. However, it goes without saying that a large number of modifications are possible, and the invention is not restricted to the above exemplary embodiments. Some possible modifications will be discussed by way of example in the text which follows.

In the above examples, the shaft 30 is straight. However, it may also be inherently bent, for example helical or generally meandering.

Whereas the coil which forms the upper frothing element 40 is bent in a generally meandering manner in the second exemplary embodiment, the coil axis can also be guided around the shaft in a deliberate spiral manner. Given suitable selection of the rotation direction of the shaft 30, a second frothing element of this type which is bent in a spiral or helical manner can convey air bubbles from a region of the liquid which is close to the surface downward into a region which is close to the base in a deliberate manner.

In the examples described above, there is no further guide or support element passing through the coil of the upper frothing element. However, it is also possible to provide a guide or support element of this type, for example in the form of a wire, which extends through the turns of the coil and of which the ends are fixed to the shaft.

In the above exemplary embodiments, the upper frothing element 40 is in the form of a coil. Whereas a coil shape is advantageous since it divides the air bubbles very finely, the upper frothing element may, however, also have a different design. The factor of primary importance is the suitability of the upper frothing element for producing air bubbles in the liquid in the region of the surface of the liquid. Other shapes, for example a wire which is provided with a large number of small bristles composed of the same or a different material, a flexible plastic hose or an elongate, flat or differently shaped rubber element, are also suitable for this purpose. Instead of providing only a single upper frothing element, it is also possible to provide a plurality of such elements, this also being advantageous for avoiding unbalance.

In addition, the lower frothing element does not need to be in the form of a toroidal coil, but can assume another suitable shape, for example the conical, corrugated shape illustrated in U.S. Design Pat. No. 476,523.

In the present example, the drive part 10 is designed to be placed on a cup 20. It goes without saying that entirely different shapes are also feasible for the drive part 10 in this respect. It is therefore feasible, for example, for arms to extend outward radially from the drive part 10, it being possible for the drive part to be placed on vessels of various diameters by way of said arms. It goes without saying that it is also possible for the drive part to be configured in such a way that it can be easily picked up by hand and held in the hand during operation, for example, by having an elongate housing shape.

The invention claimed is:

1. An apparatus for frothing liquid foodstuffs, comprising:
    a drive for generating a rotary movement;
    a shaft which is connected to the drive, the shaft having a first end close to the drive and a second end remote from the drive; and
    an elongate, flexible frothing element which is connected to the shaft at at least a first fixing point and a second fixing point that is axially different from said first fixing point, the frothing element having a length between the first and the second fixing points, at least during operation of the apparatus, that is greater than the distance between the first and second fixing points, so that the frothing element assumes a bent shape, the frothing element being sufficiently flexible for its shape to be changeable during operation of the apparatus due to centrifugal forces in the event of rotary movement of the shaft, the frothing element further being longitudinally elastic in such a way that its length is changeable during operation of the apparatus due to centrifugal forces in the event of rotary movement of the shaft.

2. The apparatus as claimed in claim 1, wherein the frothing element is sufficiently flexible for its shape to approximate a surface shape of the liquid foodstuff to be frothed during operation of the apparatus.

3. The apparatus as claimed in claim 1, wherein the frothing element is additionally connected to the shaft at at least a third fixing point, which is situated between the first and the second fixing points.

4. The apparatus as claimed in claim 3, wherein the third fixing point is displaceable on the shaft in the axial direction.

5. The apparatus as claimed in claim 1, wherein the maximum radial distance of the frothing element from the shaft is smaller than the distance between the first and the second fixing points.

6. The apparatus as claimed in claim 1, wherein the first fixing point is arranged at the first end of the shaft which is close to the drive, and the second fixing point is arranged at the second end of the shaft which is remote from the drive.

7. The apparatus as claimed in claim 1, wherein the frothing element is in the form of a helical coil with a flexible helix axis.

8. The apparatus as claimed in claim 7, wherein the shaft passes through selected turns of the helical coil at at least one of the fixing points, whereas the shaft does not pass through other turns.

9. The apparatus as claimed in claim 1, which comprises a further frothing element which is mounted at the second end of the shaft which is remote from the housing.

10. The apparatus as claimed in claim 9, wherein the further frothing element comprises a toroidal coil which is arranged substantially perpendicular to the shaft.

11. The apparatus as claimed in claim 1, wherein the apparatus has a housing which accommodates the drive and has a holding element for holding the housing in a vessel.

12. The apparatus as claimed in claim 11, wherein the holding element comprises at least one annular bearing surface to be placed on the upper edge of the vessel.

13. An apparatus for frothing liquid foodstuffs, comprising:
    a drive for generating a rotary movement;
    a shaft which is connected to the drive, the shaft having a first end close to the drive and a second end remote from the drive; and
    a frothing element comprising a helical coil, the helical coil being connected to the shaft at at least a first fixing point and a second fixing point that is axially different from said first fixing point,
    wherein the shaft passes through selected turns of the helical coil at at least one of the fixing points, whereas the shaft does not pass through other turns.

14. The apparatus as claimed in claim 13, wherein the first fixing point is arranged at the first end of the shaft which is close to the drive, and the second fixing point is arranged at the second end of the shaft which is remote from the drive.

15. The apparatus as claimed in claim 13, wherein the helical coil has a flexible helix axis.

16. The apparatus as claimed in claim 13, wherein the helical coil is sufficiently flexible for its shape to be changeable during operation of the apparatus due to centrifugal forces in the event of rotary movement of the shaft.

17. The apparatus as claimed in claim 13, wherein the helical coil is sufficiently flexible for its shape to approximate a surface shape of the liquid foodstuff to be frothed during operation of the apparatus.

18. The apparatus as claimed in claim 13, wherein the helical coil is longitudinally elastic in such a way that its length is changeable during operation of the apparatus due to centrifugal forces in the event of rotary movement of the shaft.

19. The apparatus as claimed in claim 13, wherein the helical coil is additionally connected to the shaft at at least a third fixing point, which is situated between the first and the second fixing points.

20. The apparatus as claimed in claim 19, wherein the third fixing point is displaceable on the shaft in the axial direction.

21. The apparatus as claimed in claim 13, which comprises a further frothing element mounted at the second end of the shaft which is remote from the drive.

22. The apparatus as claimed in claim 21, wherein the further frothing element comprises a toroidal coil which is arranged substantially perpendicular to the shaft.

23. An apparatus for frothing liquid foodstuffs, comprising:
- a drive for generating a rotary movement;
- a shaft which is connected to the drive, the shaft having a first end close to the drive and a second end remote from the drive;
- an elongate, flexible first frothing element which is connected to the shaft at at least a first fixing point and a second fixing point that is axially different from said first fixing point, the first frothing element having a length between the first and the second fixing points, at least during operation of the apparatus, that is greater than the distance between the first and second fixing points, so that the first frothing element assumes a bent shape, the first frothing element being sufficiently flexible for its shape to be changeable during operation of the apparatus due to centrifugal forces in the event of rotary movement of the shaft; and
- a further frothing element which is mounted at the second end of the shaft which is remote from the housing, the second frothing element comprising a toroidal coil which is arranged substantially perpendicular to the shaft.

24. The apparatus as claimed in claim 23, wherein the first frothing element is sufficiently flexible for its shape to approximate a surface shape of the liquid foodstuff to be frothed during operation of the apparatus.

25. The apparatus as claimed in claim 23, wherein the first frothing element is additionally connected to the shaft at at least a third fixing point, which is situated between the first and the second fixing points.

26. The apparatus as claimed in claim 25, wherein the third fixing point is displaceable on the shaft in the axial direction.

27. The apparatus as claimed in claim 23, wherein the frothing element is in the form of a helical coil with a flexible helix axis.

28. The apparatus as claimed in claim 23, wherein the apparatus has a housing which accommodates the drive and has a holding element for holding the housing in a vessel, the holding element comprising at least one annular bearing surface to be placed on the upper edge of the vessel.

* * * * *